US011858001B2

(12) United States Patent
Haeggström et al.

(10) Patent No.: US 11,858,001 B2
(45) Date of Patent: Jan. 2, 2024

(54) SYSTEM AND A METHOD FOR CLEANING A DEVICE

(71) Applicant: ALTUM TECHNOLOGIES OY, Helsinki (FI)

(72) Inventors: Edward Haeggström, Helsinki (FI); Petro Moilanen, Kinkomaa (FI); Ari Salmi, Helsinki (FI); Timo Rauhala, Helsinki (FI); Kasper Peterzéns, Espoo (FI)

(73) Assignee: ALTUM TECHNOLOGIES OY, Helsinki (FI)

( * ) Notice: Subject to any disclaimer, the term of this patent is extended or adjusted under 35 U.S.C. 154(b) by 35 days.

(21) Appl. No.: 17/614,997

(22) PCT Filed: May 26, 2020

(86) PCT No.: PCT/FI2020/050351

§ 371 (c)(1),
(2) Date: Nov. 29, 2021

(87) PCT Pub. No.: WO2020/240086

PCT Pub. Date: Dec. 3, 2020

(65) Prior Publication Data

US 2022/0219199 A1 Jul. 14, 2022

(30) Foreign Application Priority Data

May 31, 2019 (FI) ..................................... 20195462

(51) Int. Cl.
*B06B 3/00* (2006.01)
*B06B 1/06* (2006.01)
(Continued)

(52) U.S. Cl.
CPC .............. *B06B 3/00* (2013.01); *B06B 1/0611* (2013.01); *B08B 3/12* (2013.01); *B08B 9/0326* (2013.01);
(Continued)

(58) Field of Classification Search
CPC ..................................................... B06B 1/0611
See application file for complete search history.

(56) References Cited

U.S. PATENT DOCUMENTS 3,019,660 A 2/1962 Welkowitz
4,034,244 A 7/1977 Asai et al.
(Continued)

FOREIGN PATENT DOCUMENTS

JP 2001-225032 8/2001
JP 3809293 8/2006
(Continued)

OTHER PUBLICATIONS

Search Report for FI Application No. 20195462 dated Jan. 23, 2020, 2 pages.
(Continued)

*Primary Examiner* — Bryan P Gordon
(74) *Attorney, Agent, or Firm* — NIXON & VANDERHYE

(57) ABSTRACT

Disclosed is systems and methods for cleaning devices holding fluid such as heat exchanges. The cleaning is performed by using a system such as a transducer assembly including a mechanical wave generator and a waveguide including a cavity. The system is capable of operating at its fundamental resonance frequency even when connected to an outer surface of the device to be cleaned.

20 Claims, 6 Drawing Sheets

(51) Int. Cl.
*B08B 3/12* (2006.01)
*B08B 9/032* (2006.01)
*F28G 7/00* (2006.01)

(52) U.S. Cl.
CPC .......... *F28G 7/00* (2013.01); *B08B 2209/005* (2013.01); *B08B 2209/032* (2013.01)

(56) References Cited

U.S. PATENT DOCUMENTS

| | | | |
|---|---|---|---|
| 4,120,699 | A | 10/1978 | Kennedy, Jr. et al. |
| 4,537,511 | A | 8/1985 | Frei |
| 2007/0267176 | A1 | 11/2007 | Song et al. |
| 2008/0073063 | A1 | 3/2008 | Clavenna et al. |
| 2012/0055521 | A1 | 3/2012 | Kim et al. |
| 2015/0157354 | A1* | 6/2015 | Bales, Jr. .............. B06B 1/0223 606/169 |
| 2017/0304876 | A1* | 10/2017 | Stulen .................... A61B 50/15 |
| 2017/0341109 | A1* | 11/2017 | Forissier ................... B06B 3/00 |
| 2018/0014846 | A1* | 1/2018 | Rhee .............. A61B 17/320068 |

FOREIGN PATENT DOCUMENTS

| | | |
|---|---|---|
| SU | 1563787 | 5/1990 |
| WO | 98/49671 | 11/1998 |

OTHER PUBLICATIONS

International Search Report for PCT/FI2020/050351 dated Sep. 3, 2020, 5 pages.

Written Opinion of the ISA for PCT/FI2020/050351 dated Sep. 3, 2020, 8 pages.

* cited by examiner

SYSTEM AND A METHOD FOR CLEANING A DEVICE

CROSS-REFERENCE TO RELATED APPLICATIONS

This application is the U.S. national phase of International Application No. PCT/FI2020/050351 filed May 26, 2020 which designated the U.S. and claims priority to Finnish Patent Application No. 20195462 filed May 31, 2019, the entire contents of each of which are hereby incorporated by reference.

BACKGROUND OF THE INVENTION

Field of the Invention

The present invention relates systems and methods for cleaning devices holding fluid such as heat exchanges, in particular to systems and methods wherein the cleaning is performed by using a transducer assemblies that can operate at their natural resonance frequencies.

Description of the Related Art

Fouling within industry has an impact on both capital and operation costs. An increase in internal fouling results in poor thermal efficiency. This is coupled with poor heat and mass transfer to the metal surface of designed heat exchangers, pipes and other equipments. The cleaning of fouled heat exchanges presents a significant challenge to the maintenance and operation of e.g. chemical, petroleum and food processes. Despite efforts in the design of processes and hardware to minimize fouling, eventually the intricate interior surface of the exchanger require cleaning to restore the unit to the required efficiency.

Heat exchangers are typically cleaned onsite by removing the exchanger and by placing the unit on a wash pad for spraying with high pressure water to remove foulants. Cleaning heat exchangers in an ultrasonic bath requires specially designed vessels that allow coupling sound into them and that are capable of holding sufficient fluid to affect the cleaning, and that feature specific design to allow easy removal of the foulant material from the immersed device.

US 2012055521 discloses a segmental ultrasonic cleaning apparatus configured to remove scales and/or sludge deposited on a tube sheet. The segmental ultrasonic cleaning apparatus includes a plurality of segment groups arranged in a ring shape on a top surface of a tube sheet along an inner wall of the steam generator, in which each segment groups includes an ultrasonic element segment and a guide rail support segment loosely connected to each other by metal wires located at a lower portion of the steam generator, such that ultrasound radiated from transducer in each of the ultrasonic element segments travels along the surface of the tube sheet, with the segment groups tightly connected in the ring shape by tightening the metal wires via wire pulleys of flange units.

US 2007267176 discloses a method wherein fouling of heat exchange surfaces is mitigated by a process in which an ultrasound is applied to a fixed heat exchanger. According to the document, the ultrasound excites a vibration in the heat exchange surface and produce waves in the fluid adjacent to the heat exchange surface. The ultrasound is applied by a dynamic actuator coupled to a controller to produce vibration at a controlled frequency and amplitude that minimizes adverse effects to the heat exchange structure. The dynamic actuator may be coupled to the heat exchanger in place and operated while the heat exchanger is online.

US2008073063 discloses a method for reducing the formation of deposits on the inner walls of a tubular heat exchanger through which a petroleum-based liquid flows. The method comprises applying one of fluid pressure pulsations to the liquid flowing through the tubes of the exchanger and vibration to the heat exchanger to affect a reduction of the viscous boundary layer adjacent to the inner walls of the tubular heat exchange surfaces. Fouling and corrosion were further reduced using a coating on the inner wall surfaces of the exchanger tubes.

FIG. 1 shows a typical system 100 for cleaning a device for holding fluid. The system comprises mechanical wave generating means 101, such as an ultrasound transducer and a waveguide 102. The waveguide comprises a first end **102*a* adapted to be in contact with a device to be cleaned and a second end 102*b* which is in contact with the mechanical wave generating means, such as an ultrasound transducer. The fundamental resonance frequency of the system 100 is 20 kHz, and there are antinodes at both ends of the system. To mimic the impact of mechanical loading by the device to be cleaned, a rigid boundary condition is introduced at the first end 102*a*** of the wave guide. As a result of this loading, a node is created at the first end and the new resonance frequency of the transducer assembly is 25 kHz. The waveform of the loaded transducer assembly is also presented in the figure.

In FIG. 2 the system 100 is attached on an outer surface **103*a* of a wall 103 of a device to be cleaned. The wall is made of metal and its thickness h is 10 mm. The contact to the metal wall alters the tuning frequency of the transducer from 25 kHz to 27 kHz. Accordingly, the wall interface changes the fundamental resonance of the transducer, and the coupled resonance at 27 kHz is damped as shown in FIG. 3**.

As shown in FIGS. 1-3, the use of system like 100 for cleaning purposes has its challenges. Accordingly, there is a need for further systems and methods for cleaning of devices.

SUMMARY OF THE INVENTION

The present invention is based on the observation that at least some of problems related to cleaning of a device for holding fluid, such as a heat exchanger, can be avoided or at least alleviated when the cleaning is performed by using a system, such as a transducer assembly which is able to operate at its fundamental resonance frequency even when in contact with the device to be cleaned.

Accordingly, it is an object of the present invention to provide a system for cleaning a device, the system comprising

- mechanical wave generating means,
- a waveguide comprising
  - a first end adapted to be in contact with outer surface of the device
  - a second end wherein the second end is in contact with the mechanical wave generating means,
  - a cavity comprising a base portion separated from the second end by a distance I.

The mechanical wave generating means is adapted to emit mechanical waves through the waveguide to outer surface of the device. Waveform of the mechanical waves is adapted to be such that there is an antinode positioned in the waveguide at the distance I from the second end. The maximum diameter $D_{max}$ of the waveguide is less than ½ of wavelength of the mechanical waves, and ratio of diameter d of the base portion and the diameter D of the waveguide at distance I from the second end is 0.9 or less, preferably from 0.2 to 0.9, more preferably from 0.4 to 0.8.

It is another object of the present invention to provide a new method for cleaning a device with the system disclosed and claimed.

It is still another object of the present invention to provide a new use of the of the system as disclosed and claimed for cleaning a device holding fluid.

Further objects of the present invention are also described.

Exemplifying and non-limiting embodiments of the invention, both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of unrecited features. The features recited in the accompanied depending claims are mutually freely combinable unless otherwise explicitly stated. Furthermore, it is to be understood that the use of "a" or "an", i.e. a singular form, throughout this document does not exclude a plurality.

The terms acoustic, elastodynamic and ultrasonic are used in this document as synonyms.

BRIEF DESCRIPTION OF DRAWINGS

The exemplifying and non-limiting embodiments of the invention and their advantages are explained in greater detail below with reference to the accompanying drawings, in which.

DESCRIPTION OF THE PREFERRED EMBODIMENTS

Figure 1:
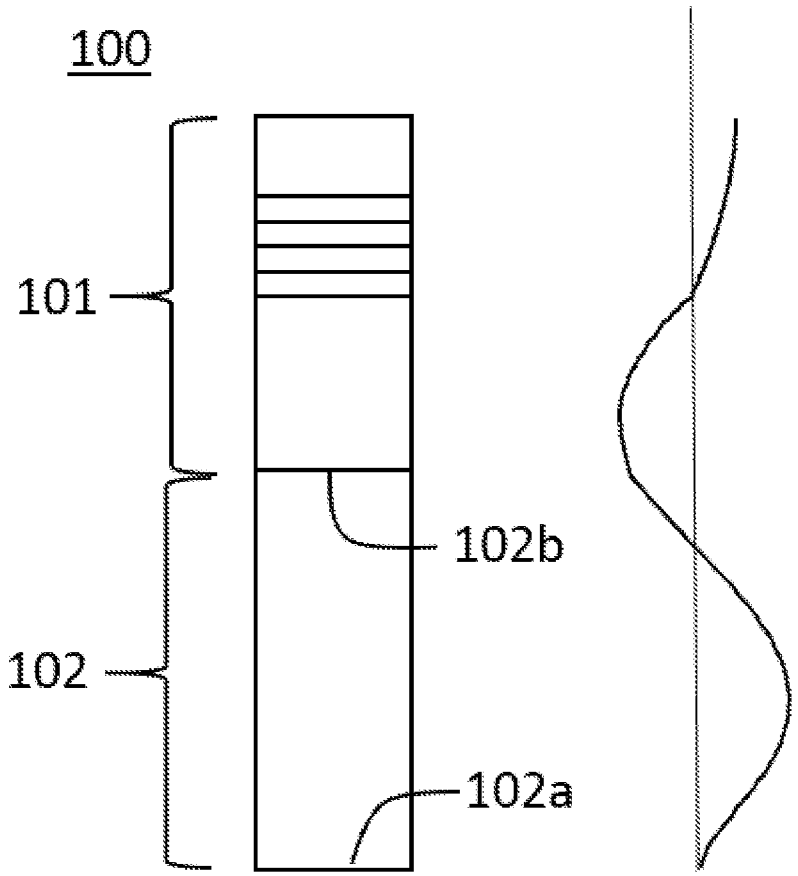
FIG. 1 shows a transducer assembly according to prior art comprising a waveguide comprising a first end adapted to be contacted with a device to be cleaned.
Figure 2:
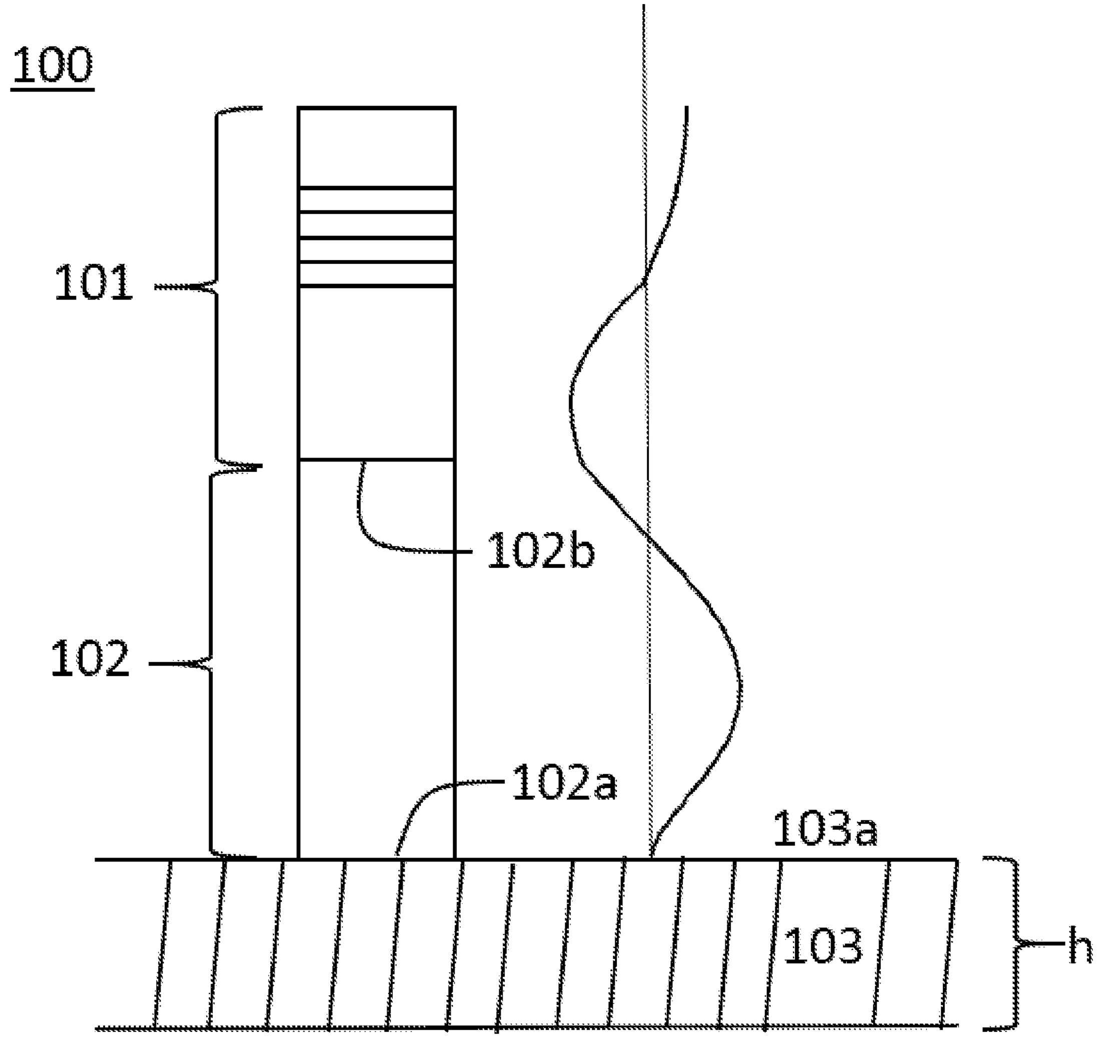
FIG. 2 shows a situation where the transducer assembly of FIG. 1 is connected to an outer surface of a device to be cleaned.
Figure 3:
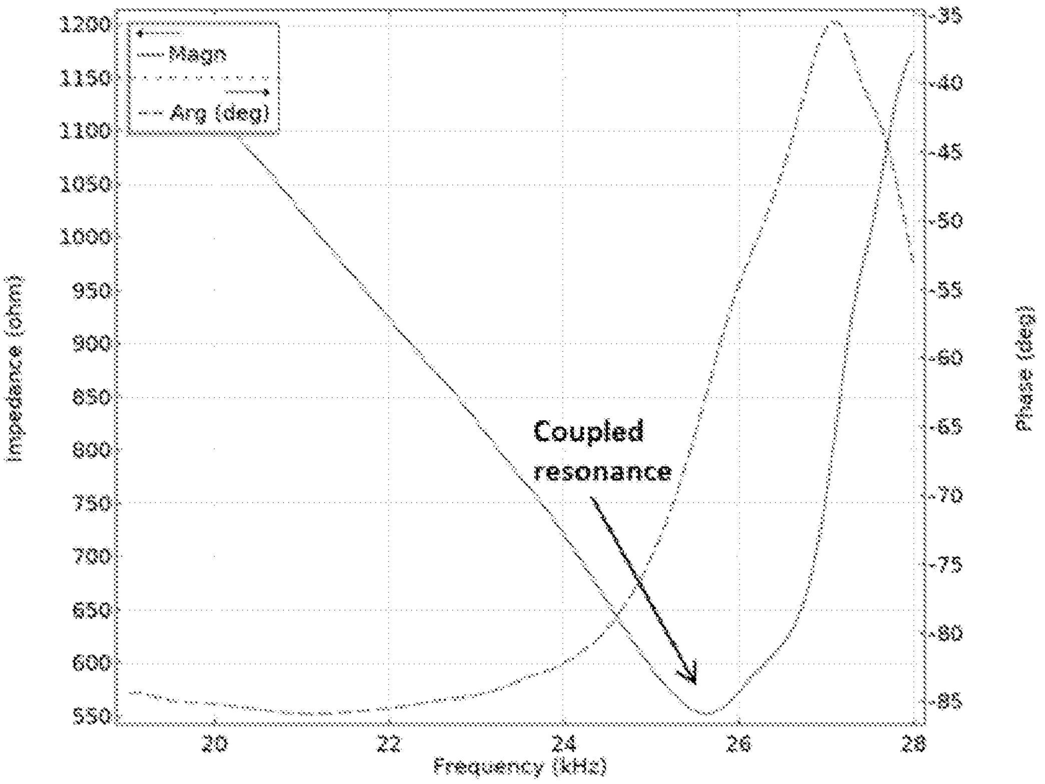
FIG. 3 shows electrical impedance curves of a situation wherein the transducer assembly of FIG. 1 is connected with at a 10 mm thick metal wall.

FIGS. 1-3 have been discussed in Background section of this document.

As defined herein, a point-like pressure source is a pressure source which has at least one of its dimension smaller, e.g. at least two times smaller than the wavelength generated by the pressure source in a fluid within the device to be cleaned and/or in a wall of the device to be cleaned. For example, for a point source contacting a metal surface utilizing longitudinal 20 kHz ultrasound, a point-like pressure source is a source with a contact diameter significantly smaller than 25 mm, e.g. 12.5 mm, and for 100 kHz ultrasound, significantly smaller than 5 mm, e.g. 2.5 mm. For different wave modes, these diameters are adjusted according to the speed of sound of the mode.

In the following text, the system and the method of the present invention is exemplified by different transducer assemblies.

The principle of the method of the present invention for cleaning a device holding fluid, such as liquid, is presented using an exemplary non-limiting system shown in FIGS. 4A and 4B. Accordingly, a system 200 suitable for the method comprises a mechanical wave generating means 201 and a waveguide 202. The waveguide comprises a first end 202*a* adapted to be positioned on outer surface 203*a* of a device to be cleaned and a second end 202*b* which is in contact with the mechanical wave generating means. The waveguide comprises a cavity 204 comprising a base portion 204*a* which is substantially in xz-plane of the coordinate system 299. The cavity is preferably positioned around acoustic axis 205 of the system. Distance of the base portion from the second end of the waveguide in y-direction of the coordinate system is marked in the figure with a letter I. The distance I is selected such that when the mechanical wave generating means emits succession of mechanical waves through the wave guide to the outer surface, there is an antinode 206 at distance I from the second end, i.e. in proximity of the base portion.

Diameter of the waveguide, and diameter of the cavity at the distance I from the second end in x-direction of the coordinate system 299 is marked in FIG. 4A with symbols D and d, respectively. When the ratio d/D is 0.9 or less, the portions of the waveguide marked with reference numbers 207*a* and 207*b* in FIG. 4B act as point like pressure sources and are adapted to emit mechanical waves, marked with arrows 208*a* and 208*b* in FIG. 4B, towards the outer surface. The correct position of the antinode can be adjusted by proper design of the system as discussed later in detail. Distance of the portions 207*a* and 207*b* from the acoustic axis 205 of the system is preferably same. The maximum diameter $D_{max}$ of the waveguide is less than ½ of wavelength of the mechanical waves. In titanium λ would be ca 0.4 m, whereas in copper it would be ca 0.2 m, and in steel it would be ca 0.3 m.

The portions 207*a* and 207*b* act as point pressure sources and interfere in the waveguide resulting a propagating wave marked with an arrow 209. The waveguide delivers the wave through the wall 203 to the inner surface 203*b*. The interfering mechanical waves 210 make the inner surface vibrate. As the vibrating inner surface moves, the motion produces pressure pulse 211 in the fluid 212 in the device. The pressure pulse cleans the device, for instance removes fouling from the device.

Figure 5:
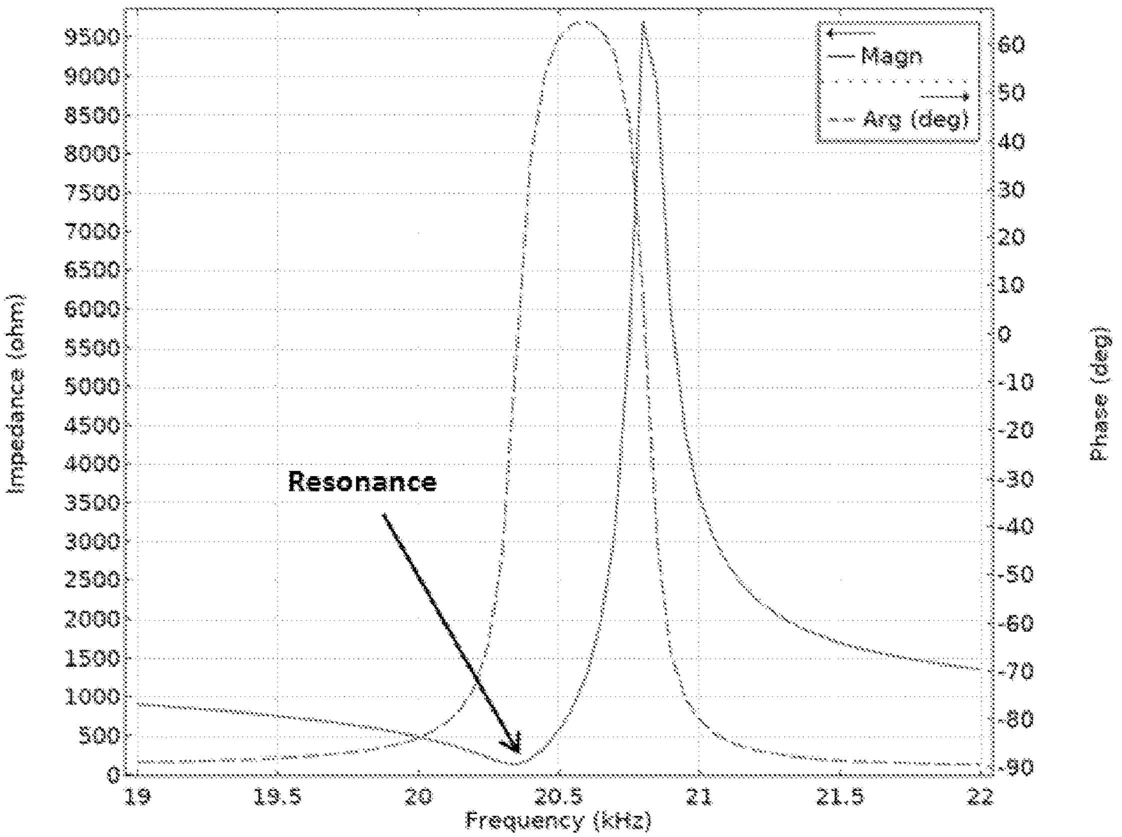
FIG. 5 shows electrical impedance curves at a 10 mm thick metal wall according to the system of FIG. 4A, FIGS. 6A-E show exemplary designs of the system of the present invention.

FIG. 5 show the magnitude (Magn) and phase (Arg) of the impedance curves of a situation wherein the transducer assembly 200 is in contact with an outer surface of a device to be cleaned. The thickness of the wall is 10 mm. The resonance frequency is 20.4 kHz i.e. consistent with the fundamental resonance of the transducer, the impedance magnitude is relatively low (150Ω) and the phase curve shifts from negative to positive at the resonance. The curves are very close to those of an unloaded transducer. In comparison, FIG. 3 shows curves for a fully mass loaded transducer. The resonance frequency is shifted to 26 kHz, the impedance magnitude is relatively high (550Ω) and the phase curve does not shift from negative to positive at the resonance. Accordingly, as the mass loading of the transducer assembly to the device to be cleaned is reduced compared e.g. to the system 100, operation of the transducer close to its natural resonance frequency is permitted.

The system of the present invention must have a waveguide comprising a cavity. It is essential that ratio of the diameter of the cavity and the waveguide at distance I from the second end is 0.9 or less, preferably 0.2 to 0.9, more preferably from 0.4 to 0.8. This is to ensure that the system can operate at its fundamental frequency even when in contact with a device to be cleaned. Other dimensions and shapes of the cavity are not critical.

Figure 6:
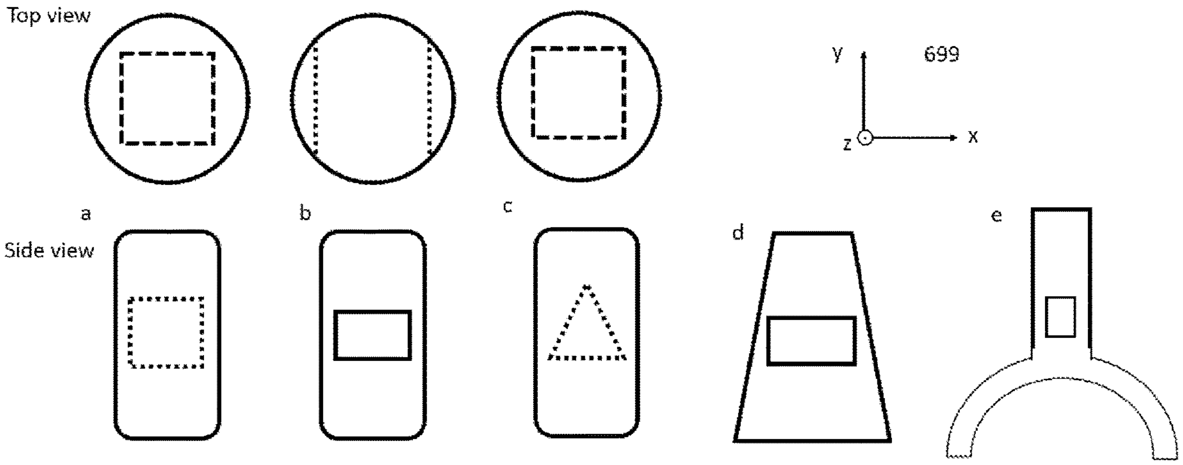

FIGS. 6*a-c* represent exemplary non-limiting cavity configurations of a cylindrical waveguide. Accordingly, the cavity can be an opening, i.e. a through hole (FIG. 6 *b*), or a hollow portion in the wave guide (FIG. 6 *a,c*). According to a particular embodiment the area of the first end of a waveguide is larger than area of the second end. This allows the acoustic radiation efficiency to be increased, by increasing the acoustic radiation impedance versus ultrasound impedance of the system. Side view of an exemplary waveguide of this type is shown in FIG. 6*d*.

According to another particular embodiment the first end is shaped for interfacing with geometry of the outer surface of the device to be cleaned. Side view of an exemplary waveguide of this type is shown in FIG. 6*e*. The first end, such as the one shown in FIG. 6*e* may also comprise clamping means for fastening and tightening the system to the outer surface of the device to be cleaned.

Figure 7:
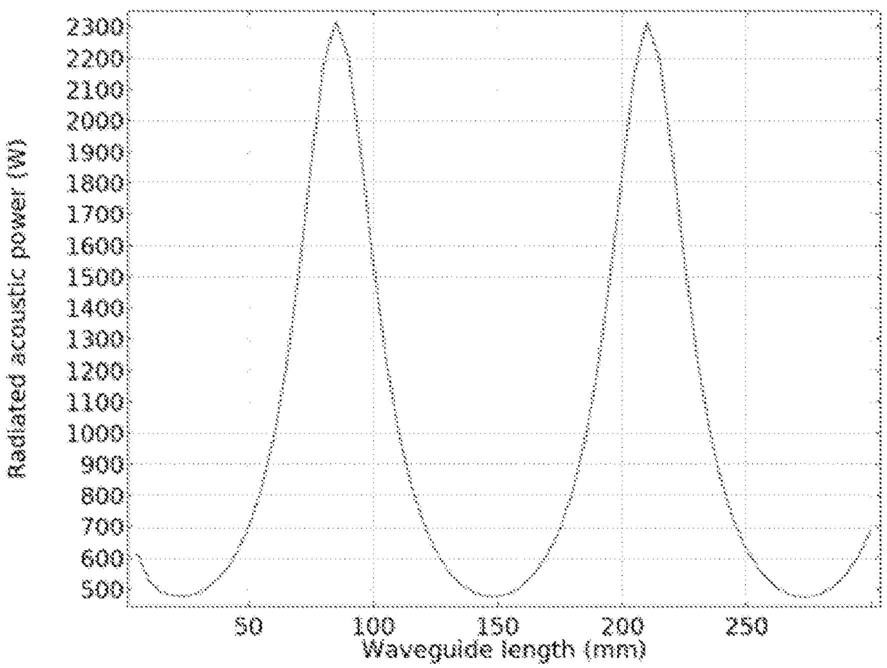
FIG. 7 shows radiated acoustic power obtainable from an exemplary system according to the present invention as a function of distance h.

As shown in FIG. 4A, the base portion 204*a* of the cavity is separated from the first end by a distance marked with letter h. FIG. 7 presents radiated acoustic power of a system as a function of the distance h when the actuation power was fixed. The figure is based on numerically simulated 20 kHz driving of a 38 mm cylindrical waveguide fixed at a 10 mm thick steel wall having water on the other side. As seen from the figure, the distance h has plurality optimums, one of which is about 85 mm and another one at about 210 mm.

According to still another particular embodiment, the first end of the waveguide is designed to further enhance the ability of the system to operate at its fundamental resonance frequency. Exemplary design alternatives are presented in FIG. 8. According to one embodiment, the first end comprises an opening 813*a*, wherein the opening is adapted to be towards the outer surface. According to this embodiment side walls 814 of the opening act as point like pressure sources when the system is in operation. The opening can be also such that it is not through the walls of the first end but like the one shown in FIG. 8 *d*.

According to another embodiment the first end comprises at least one pair of protrusions 813*b* or one or more circular protrusions 813*c* adapted to be positioned on the outer surface of the device to be cleaned. The distance d' between the two protrusion in the x-direction of the coordinate system 899 is preferably smaller than half of the acoustic wavelength in the fluid and/or wall of the device, for example, at 20 kHz d'<38 mm. If the wall thickness of the device to be cleaned is thin e.g. <10 mm, the protrusions should be close to each other. An exemplary distance d' is 5-25 mm, 20 kHz. This is to ensure that an interference point is formed on the inner surface of the wall. According to an exemplary embodiment the height of the protrusion in the y-direction of the coordinate system 899 is 1-100 mm. An exemplary protrusion length is 10 mm. The protrusions are adapted to act as point-like pressure sources. The contact area of the first end i.e. the contact area of the protrusions is less than 100%. According to a preferable embodiment, the contact area of the at least one pair of protrusions is 1-30%, more preferably 1-20%, most preferably about 10% of the total area of the first end. An exemplary contact area of a protrusion or a circular protrusion acting as a point-line pressure source is 110-330 $mm^2$.

Figure 4:
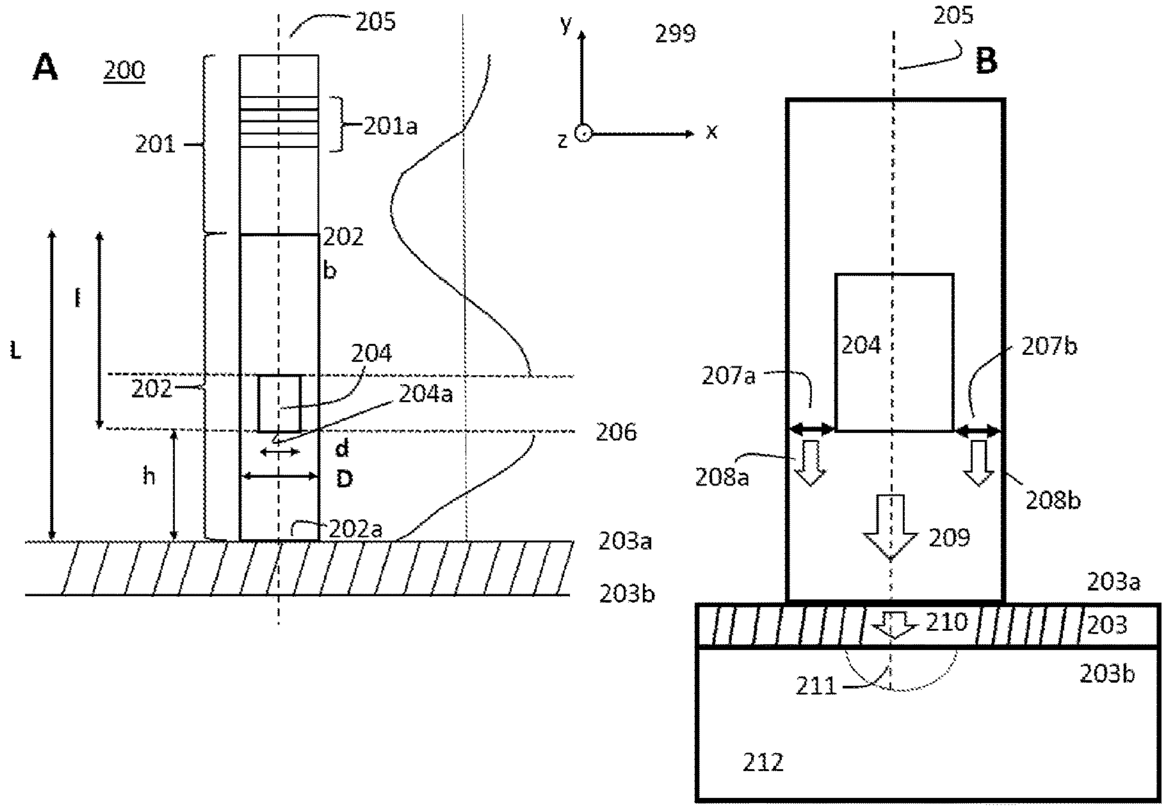
FIG. 4A and FIG. 4B show the principle of present invention for cleaning a device holding fluid by using an exemplary non-limiting transducer assembly.
Figure 8:
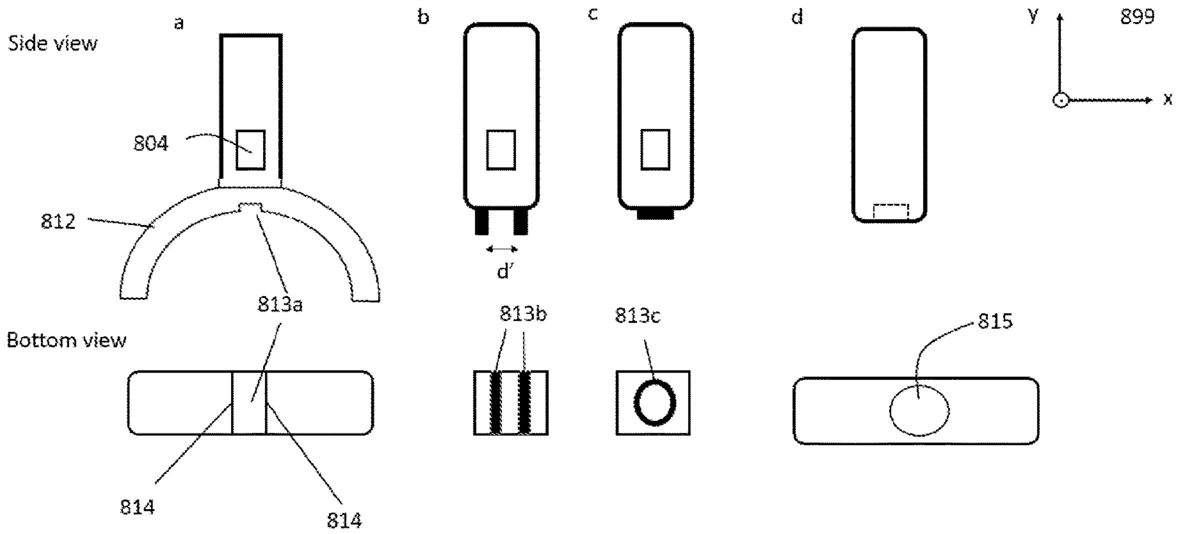
FIG. 8 shows exemplary non-limiting designs of the first end of a system of the present invention.

In the structure depicted in FIG. 8 (804, 813*a*) there are two cavities, one in the wave generating means similarly as described in FIG. 4, and another one in the coupling structure 812. The first cavity decouples the transducer from the load, whereas the second cavity 813*a* generates two point-like sources from the edges of the cavity 814 which generate waves which constructively interfere and generate a leaky Lamb wave which efficiently generates sound in the fluid. This dual cavity structure allows more freedom when selecting the size of the secondary cavity 813*a*.

According to one embodiment the mechanical wave generating means is a Langevin transducer. A Langevin transducer comprises a front mass (head), a back mass (tail) and piezoelectric ceramics. A Langevin transducer is a resonant transducer for high-power ultrasonic actuation. The transducer is composed by a stack of piezoelectric disks 201*a*, e.g. 2, 4, 6 or 8 disks, clamped between two metallic bars, typically aluminum, titanium or stainless-steel, that feature a front mass and a back mass of the transducer, respectively. The length of the front mass and back mass of the transducer are tuned so that the transducer behaves as a half-wavelength resonator, i.e. a fundamental standing wave is born along the long axis of the transducer, featuring an antinode at both ends of the transducer. This results in an antinode at the first end 300*a* and at the second end 300*b* of the transducer assembly, and a nodal point at the middle of the waveguide. Such a transducer is narrowband featuring sharp resonance and antiresonance, separated typically by a narrow, e.g. 1 kHz, frequency interval. Optimal and natural resonance behavior occurs when the transducer is driven in free space (no mechanical load). Any loading damps the resonance, increases the bandwidth and affects the resonance frequency. Heavy loading kills the fundamental resonance. Although the transducer assembly still is able to operate at higher resonance frequencies even when heavily loaded its efficiency is reduced. The higher resonance frequencies are in this case those of the coupled system, i.e. loading-modified higher resonance frequencies of the transducer assembly.

According to another embodiment the present invention concerns a method for cleaning a device holding fluid. The method comprising the following steps a) providing a system 200 comprising
 - mechanical wave generating means 201 and
 - a waveguide 202 comprising
   - a first end 202*a* adapted to be in contact with outer surface of the device 203
   - a second end 202*b* wherein the second end is in contact with the mechanical wave generating means,
 - a waveguide comprising a cavity 204 comprising a base portion 204*a* in xz-plane of the coordinate system 299, the base portion separated from the second end by a distance I in y-direction of the coordinate system,
 - the mechanical wave generating means is adapted to emit mechanical waves through the waveguide to the outer surface,
 - waveform of the mechanical waves is adapted to be such that there is an antinode 205 positioned in the waveguide at the distance I from the second end, maximum diameter $D_{max}$ of the waveguide in x-direction of the coordinate system 299 is less than ½ of wavelength of the mechanical waves and in that ratio of diameter d of the base portion and the diameter D of the waveguide in x-direction of the coordinate system 299 at distance I is 0.9 or less, preferably from 0.2 to 0.9, most preferably from 0.2 to 0.8.

b) contacting the first end with outer surface of the device, c) the mechanical wave generating means emitting, via waveguide succession of mechanical waves inner surface of the device, d) the mechanical waves interfering at the inner surface and producing a vibrating inner surface, and e) the vibrating inner surface producing and emitting a pressure pulse into the fluid.

The thickness of the vessel wall of the device to be cleaned is typically 2-30 mm. The point like pressure sources such as the protrusions of the waveguides of a transducer are preferably made of material that is softer than the material of surface of the device. According to an exemplary embodiment, the surface of the device is made of stainless steel and the protrusions are made of aluminum.

Experimental

Design of the Transducer Assembly

The transducer assembly was composed of a piezoelectric ultrasonic stack transducer (Langevin transducer, sandwich transducer) and an optional waveguide. The transducer was either a commercially available model, or a custom made one. The transducer was a narrowband (featuring typically e.g. a 1 kHz bandwidth) resonant transducer, composed by a stack of piezoelectric disks (e.g. 2, 4, 6 or 8 disks), clamped between two metallic bars (typically aluminium, titanium or stainless steel) that feature front mass and back mass of the transducer.

The transducer design was based on a chosen resonant frequency (e.g. 20 kHz) which determines the choice (material and dimensions) of the piezoelectric disks. The stack of piezoelectric disks features a narrowband resonator. The lengths of the front mass and back mass were tuned such that the coupled resonator (i.e. transducer) behaves as a half-wavelength (lambda/2) resonator at the chosen frequency. This is the fundamental resonance of the transducer. The bandwidth remained narrow (e.g. 1 kHz). Transducer design was based on theoretical and/or numerical modelling (finite-element simulations).

An optional waveguide was fitted as an extension on the first end of the transducer. The length of the waveguide was chosen/tuned so as to maintain the fundamental resonance behavior of the transducer. To this end, the waveguide length must be a multiple of lambda/2. A waveguide may be useful e.g. to increase the q-value of the transducer assembly, to provide thermal insulation between the transducer and a system to be cleaned, or to provide flexibility in transducer placement in situations when the transducer cannot directly fit against the device to be cleaned. Waveguide design is based on theoretical and/or numerical modelling (e.g. finite-element simulations).

Point-like contacts (e.g. contact protrusions, openings) were machined as extensions on the first end of a transducer assembly. Cavities were machined in the waveguide. The shapes of the contact structures were evaluated and optimized by theoretical and/or numerical modelling (finite-element simulations).

The specific examples provided in the description given above should not be construed as limiting the scope and/or the applicability of the appended claims.

What is claimed is:

1. A system for cleaning a device for holding fluid, the system comprising mechanical wave generating means and a waveguide comprising a first end adapted to be in contact with an outer surface of the device a second end wherein the second end is in contact with the mechanical wave generating means, wherein the waveguide comprises a cavity comprising a base portion, the base portion separated from the second end by a distance I, the mechanical wave generating means is adapted to emit mechanical waves through the waveguide to the outer surface, the distance I is such that when the mechanical wave generating means emits a succession of mechanical waves through the waveguide to the outer surface, there is an antinode positioned in the waveguide at the distance I from the second end, a maximum diameter $D_{max}$ of the waveguide is less than ½ of a wavelength of the mechanical waves and wherein the ratio of diameter d of the base portion to the diameter D of the waveguide at the distance I is from 0.2 to 0.9.

2. The system according to claim 1, wherein the diameter D is 10 cm or less at the distance I from the second end.

3. The system according to claim 1, wherein area of the first end is larger than area of the second end.

4. The system according to claim 1, wherein the shape of the waveguide is selected from cylindrical and conical.

5. The system according to claim 1, wherein the first end is shaped for interfacing with the geometry of the outer surface.

6. The system according to claim 1, wherein the first end comprises clamping means for tightening the system to the outer surface.

7. The system according to claim 1, wherein the first end comprises an opening adapted to be positioned towards the outer surface.

8. The system according to claim 1, wherein the first end comprises at least one pair of protrusions adapted to act as a pair of point-like pressure sources, or at least one circular protrusion adapted to act as a circular point-like pressure source.

9. The system according to claim 8, wherein the at least one pair of protrusions comprises a first member and a second member, and the distance between the first member and the second member is ≤4h, wherein h is the thickness of the wall, or when the first end comprises at least one circular protrusion, the radius of the at least one circular protrusion is ≤2h, wherein h is the thickness of the wall.

10. The system according to claim 8, wherein the sum of contact areas of the at least one pair of protrusions or contact area of the at least one circular protrusion with the outer surface is 1-30% of total area of the first end.

11. The system according to claim 1, wherein the mechanical waves are ultrasound waves.

12. A method for cleaning a device holding fluid, the device comprising an outer surface and an inner surface, with a system as defined in claim 1, the method comprising following steps:

a) positioning the first end of the waveguide in contact with outer surface of the device, b) mechanical wave generating means emitting, through the waveguide, a succession of mechanical waves comprising an antinode at distance I from the second end towards the inner surface, c) the mechanical waves interfering on the inner surface and producing a vibrating inner surface, and d) the vibrating inner surface producing a pressure pulse into the fluid.

13. The method according to claim 12, wherein the device is a heat exchanger.

14. The method according to claim 12, wherein the fluid is liquid.

15. The system according to claim 8, wherein the sum of contact areas of the at least one pair of protrusions or contact area of the at least one circular protrusion with the outer surface is 1-20% of total area of the first end.

16. The system according to claim 8, wherein the sum of contact areas of the at least one pair of protrusions or contact area of the at least one circular protrusion with the outer surface is 10% of total area of the first end.

17. The system according to claim 2, wherein the mechanical waves are ultrasound waves.

18. The system according to claim 3, wherein the mechanical waves are ultrasound waves.

19. The system according to claim 4, wherein the mechanical waves are ultrasound waves.

20. The system according to claim 5, wherein the mechanical waves are ultrasound waves.

* * * * *